US012277345B2

(12) United States Patent
Segev et al.

(10) Patent No.: US 12,277,345 B2
(45) Date of Patent: Apr. 15, 2025

(54) SCATTER GATHER LIST ADAPTIVE BUCKETING

(71) Applicant: Western Digital Technologies, Inc., San Jose, CA (US)

(72) Inventors: Amir Segev, Meiter (IL); Shay Benisty, Beer Sheva (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/351,322

(22) Filed: Jul. 12, 2023

(65) Prior Publication Data

US 2024/0152293 A1   May 9, 2024

Related U.S. Application Data

(60) Provisional application No. 63/423,883, filed on Nov. 9, 2022.

(51) Int. Cl.
   *G06F 3/06* (2006.01)
(52) U.S. Cl.
   CPC .......... *G06F 3/0659* (2013.01); *G06F 3/0607* (2013.01); *G06F 3/0679* (2013.01)
(58) Field of Classification Search
   CPC .... G06F 3/0659; G06F 3/0607; G06F 3/0679; G06F 3/0608; G06F 3/0638; G06F 3/061

USPC ........................................................ 711/154
See application file for complete search history.

(56) References Cited

U.S. PATENT DOCUMENTS

| 10,275,378 | B2  | 4/2019  | Benisty |
| 10,339,079 | B2  | 7/2019  | Dewitt et al. |
| 10,540,096 | B2  | 1/2020  | Olcay |
| 11,199,992 | B2  | 12/2021 | Richter et al. |
| 12,026,395 | B2* | 7/2024  | Springberg ........... G06F 3/0644 |
| 2017/0116117 | A1 | 4/2017 | Rozen et al. |
| 2022/0100681 | A1* | 3/2022 | Chen .................. G06F 12/0824 |

* cited by examiner

*Primary Examiner* — Hua J Song
(74) *Attorney, Agent, or Firm* — PATTERSON + SHERIDAN, LLP (57) ABSTRACT

The present disclosure generally relates to memory management during SGL fetching. When a data storage device is required to fetch an SGL from a host device, the data storage device cannot determine how much memory will be required to be allocated. The disclosure herein reduces the impact of the problem of under or over allocating memory and over-fetching, thereby reducing performance of the device during transfers. The disclosure provides guidance on how to implement an adaptive learning process based upon statistic collection of SGL fetches. By maintaining a table of statistics, the data storage device controller may learn and more closely predict an amount of memory to allocate for SGL fetching.

20 Claims, 8 Drawing Sheets

SCATTER GATHER LIST ADAPTIVE BUCKETING

CROSS-REFERENCE TO RELATED APPLICATIONS

This application claims benefit of U.S. Provisional Patent Application Ser. No. 63/423,883, filed Nov. 9, 2022, which is herein incorporated by reference.

BACKGROUND OF THE DISCLOSURE

Field of the Disclosure

Embodiments of the present disclosure generally relate to memory management during SGL fetching.

Description of the Related Art

For a data storage device to transfer data to and from a host device, the data storage device requires an address on the host side. One method of conveying the addresses on the host side is called a Scatter Gather List (SGL). However, whenever a data storage device fetches an SGL segment, the data storage device does not know if there are any additional segments or how big those segments may be. The standard allows for a single SGL segment to be as big as 64K entries. As a result, a data storage device does not know what amount of memory to allocate for the SGL when the data storage device receives the SGL. The data storage device may either over allocate memory and not have enough pointers from the SGL to fill the allocated space, or the data storage device may have under allocated memory and will iteratively add more memory while receiving the SGL. Either scenario results in performance degradation of the device.

Therefore, there is a need in the art for optimizing memory allocation for SGL fetching.

SUMMARY OF THE DISCLOSURE

The present disclosure generally relates to memory management during SGL fetching. When a data storage device is required to fetch an SGL from a host device, the data storage device cannot determine how much memory will be required to be allocated. The disclosure herein reduces the impact of the problem of under or over allocating memory and over-fetching, thereby reducing performance of the device during transfers. The disclosure provides guidance on how to implement an adaptive learning process based upon statistic collection of SGL fetches. By maintaining a table of statistics, the data storage device controller may learn and more closely predict an amount of memory to allocate for SGL fetching.

In one embodiment, a data storage device comprises: a memory device; and a controller coupled to the memory device, wherein the controller is configured to: receive a command, wherein the command comprises a Scatter Gather List (SGL); determine an amount of memory needed for fetching the SGL, wherein the determining comprises consulting a table of one or more previous command SGL statistics; allocate the amount of memory; and fetch the SGL.

In another embodiment, a data storage device comprises: a memory device; and a controller coupled to the memory device, wherein the controller is configured: to receive one or more commands, wherein the one or more commands comprise Scatter Gather Lists (SGLs); collect attributes of the one or more commands; classify the one or more commands; average the collected attributes of the one or more commands; and store the collected attributes in the statistic table.

In another embodiment, a data storage device comprises: memory means; and a controller coupled to the memory means, wherein the controller is configured to: receive one or more commands; collect attributes of the one or more commands; and adaptively change memory allocations for future commands based upon the collected attributes.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to memory management during SGL fetching. When a data storage device is required to fetch an SGL from a host device, the data storage device cannot determine how much memory will be required to be allocated. The disclosure herein reduces the impact of the problem of under or over allocating memory and over-fetching, thereby reducing performance of the device during transfers. The disclosure provides guidance on how to implement an adaptive learning process based upon statistic collection of SGL fetches. By maintaining a table of statistics, the data storage device controller may learn and more closely predict an amount of memory to allocate for SGL fetching.

Figure 1:
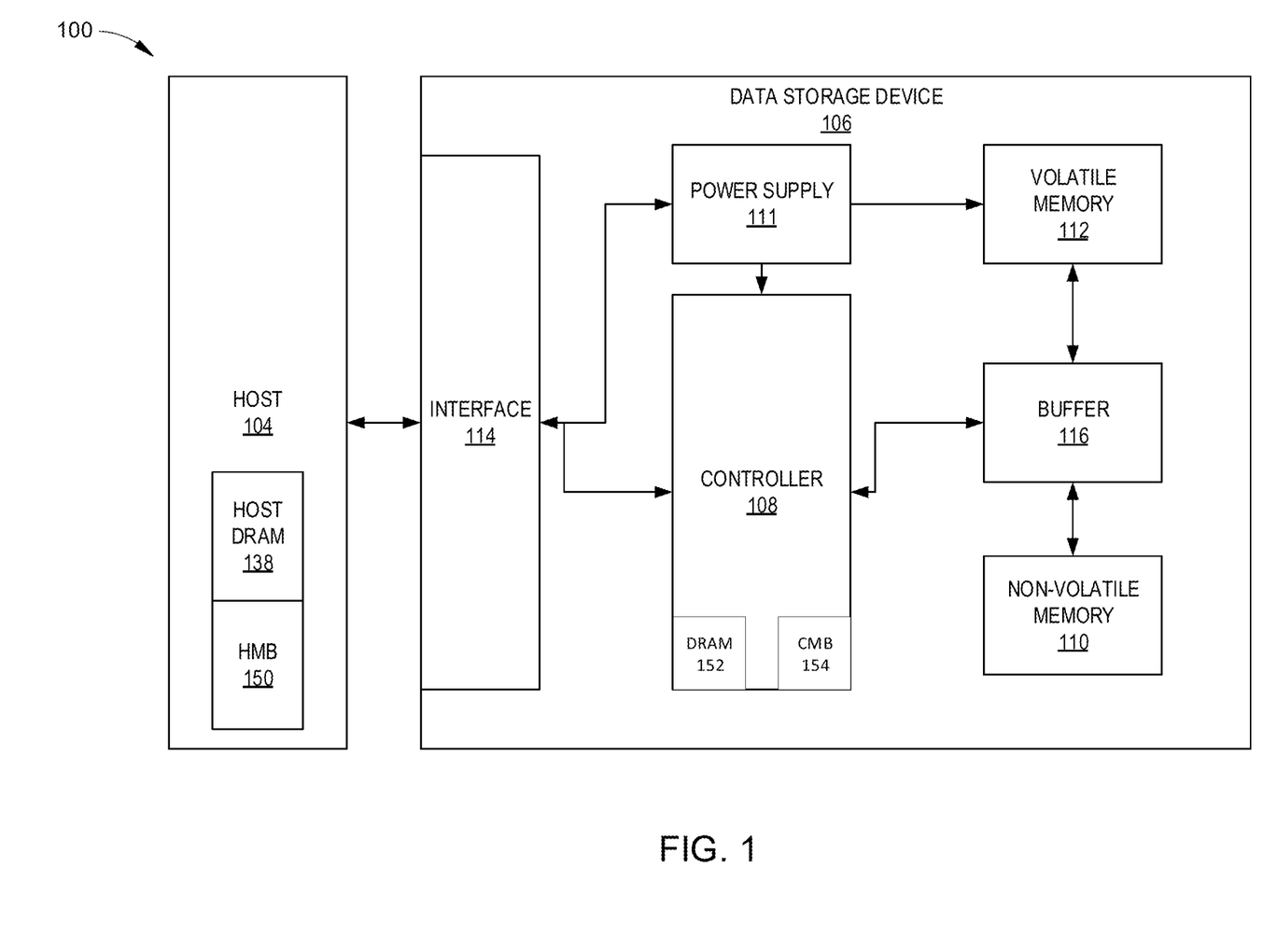
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in an internal memory of the controller 108 (i.e., a second volatile memory), which may be SRAM memory, prior to sending the data to the NVM 110. In some embodiments, the controller 108 includes DRAM 152 as well as controller memory buffer (CMB) 154. In some embodiments, the host device 104 has DRAM 138 that includes the host memory buffer (HMB) 150 that permits the data storage device 106 to store data therein. In embodiments where HMB 150 is present, the data storage device 106 may or may not have DRAM 152 in the controller 108.

Figure 2:
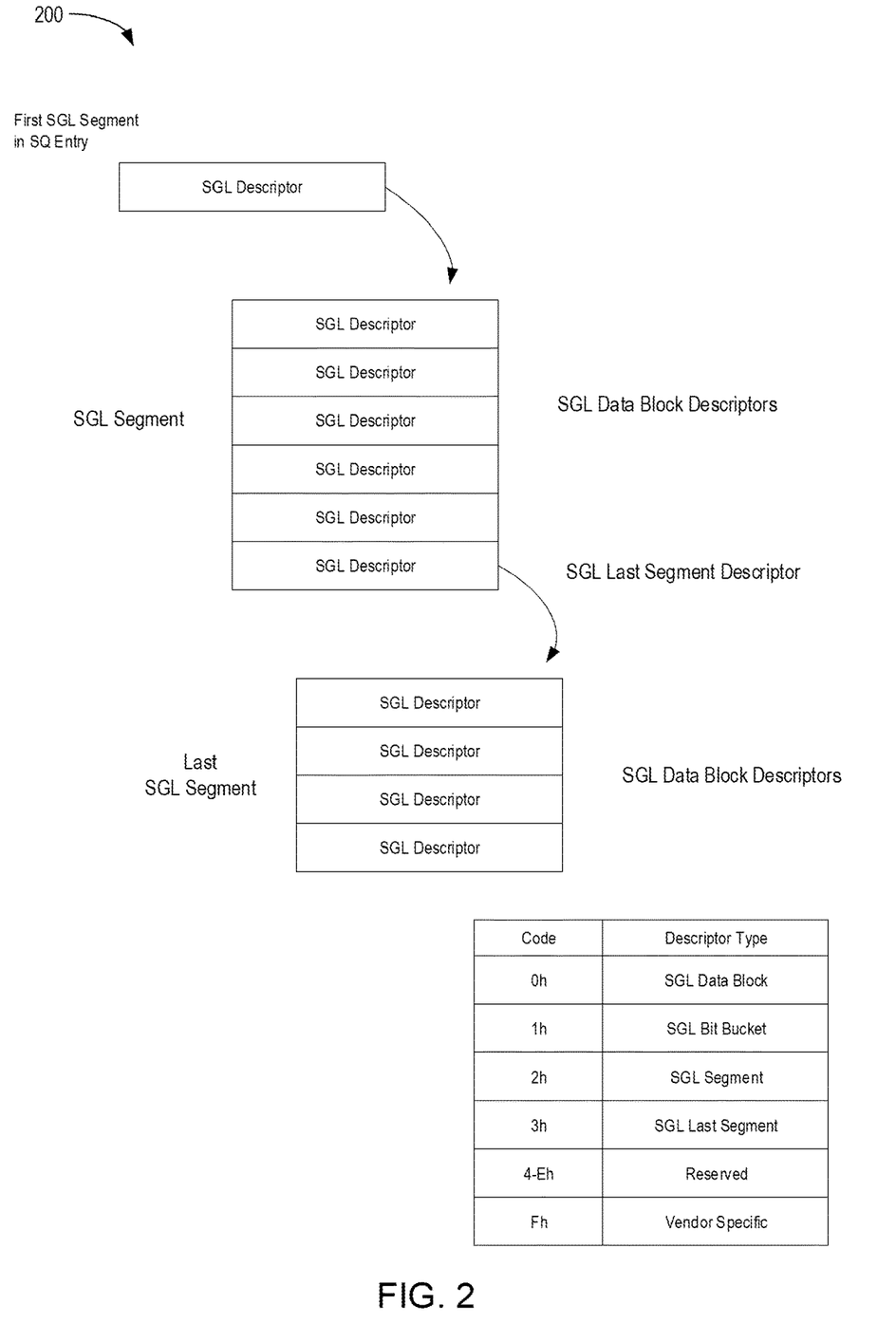
FIG. 2 is an illustrative example of a scatter gather list structure.

FIG. 2 is an illustrative example 200 of a scatter gather list structure. When a data storage device receives a command, the command contains the first pointer. The first section is a pointer that points to a next SGL segment. The second section is the next SGL segment with 5 SGL data blocks and one pointer pointing to a last SGL segment. The third section is the last SGL segment and is comprised of 4 SGL data blocks. In this illustrative example, in total, the command comprises 9 different pointers.

The standard allows SGL segments and SGL data blocks to be of any size. Therefore, it is possible that the command and the 9 different pointers may cover anywhere from 512 bytes to 512 MB and more in size. The standard even allows for a single segment to be as big as 64K entries.

When the device fetches the second SGL segment, the device does not know what size the third segment will be, or if a third segment even exists. If the device needs to fetch pointers for 4K out of a 16K command, it may be enough to fetch only the first entry of the SGL, or possibly all entries.

Figure 3:
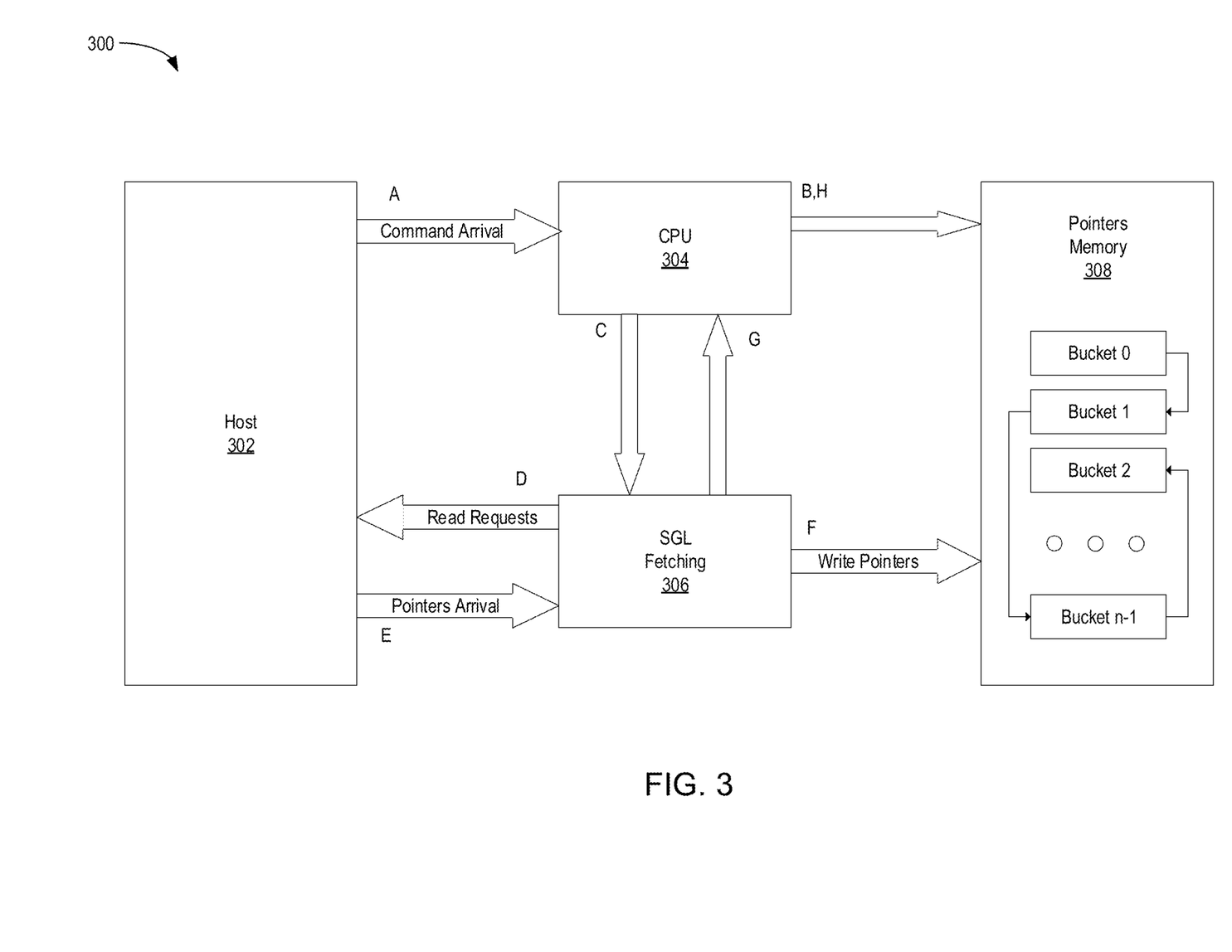
FIG. 3 is an example flow of how scatter gather lists are fetched from a host.

FIG. 3 is an example flow 300 of how SGL are fetched from a host, according to certain embodiments. Letters have been assigned to arrows to display the order of the flow.

The flow 300 first starts with a host 302 sending a command which arrives at the CPU 304 with step A. Once the CPU 304 has received the command, the CPU 304 adjusts a value "remaining_bucket_size" representing the remaining number of SGL entries in a new segment. Next, the CPU 304 finds a portion of memory, a local-bucket in this instance, which is free to write to with step B. Each local-bucket in memory 308 supports up to N SGL entries.

Once a free bucket is selected, the CPU 304 requests for the hardware to fetch SGL entries and to fill the memory space available in the local-bucket with step C. The request is sent to the SGL fetching module 306. During step D, the SGL fetching module 306 performs a read of either all of local-bucket (N entries), or as many SGL entries as remain available as was determined during step A. The fetching is according to the algorithm F=MIN(N, remaining_bucket_size). As a result of fetching the values gets updated. After the SGL fetching module 306 attempts to fetch the SGL entries, the total number of remaining SGL entries remaining to be fetched is updated (remaining_bucket_size) and lowered with the total amount of SGL entries fetched (F) and the same goes for remaining memory local-bucket size which is updated and lowered by the amount of memory written to (N=N−F).

The host 302 receives the request for SGL entries from the SGL fetching module 306 and sends pointers associated with the SGL entries back to the SGL fetching module 306 with step E. If there are still SGL entries remaining to be fetched and there is room in the local-bucket (i.e., if N>0), the flow returns to step D until all SGL entries have been fetched and the bucket is full.

The SGL fetching module 306 then writes the pointers to the dedicated memory with step F. The CPU 304 is reported to with the results of the fetching with step G. Finally, with Step H, using the information from step G, the CPU 304 can then allocates another bucket (of N entries) if needed and links the bucket to the previous bucket and repeats back to step C. Buckets 0 and 1, 1 and n−1, and n−1 and 2 are shown to be linked in FIG. 3.

The data storage device can configure the total number of SGL entries or change the size of the buckets to be larger or smaller. With large buckets, the data storage device has less buckets overall and as each bucket only works for a single command, the data storage device may not have enough buckets for currently available commands and data. The data storage device then needs to wait for the commands and data which we have already fetched pointers to no longer occupy the larger buckets. With small buckets, the device will need to repeat step H many more times, causing the fetching process to take more time, resulting in decreased performance of the device.

When working with SGLs, there may be either a lack of pointers or a lack of data, each causing performance degradation. The disclosure herein discussed optimization of bucket size versus number of iterations. Previously a very large memory was used to do over fetching while N (i.e., number of SGL entries fetched per iteration) was a fixed value and did not change dynamically.

Figure 4A:
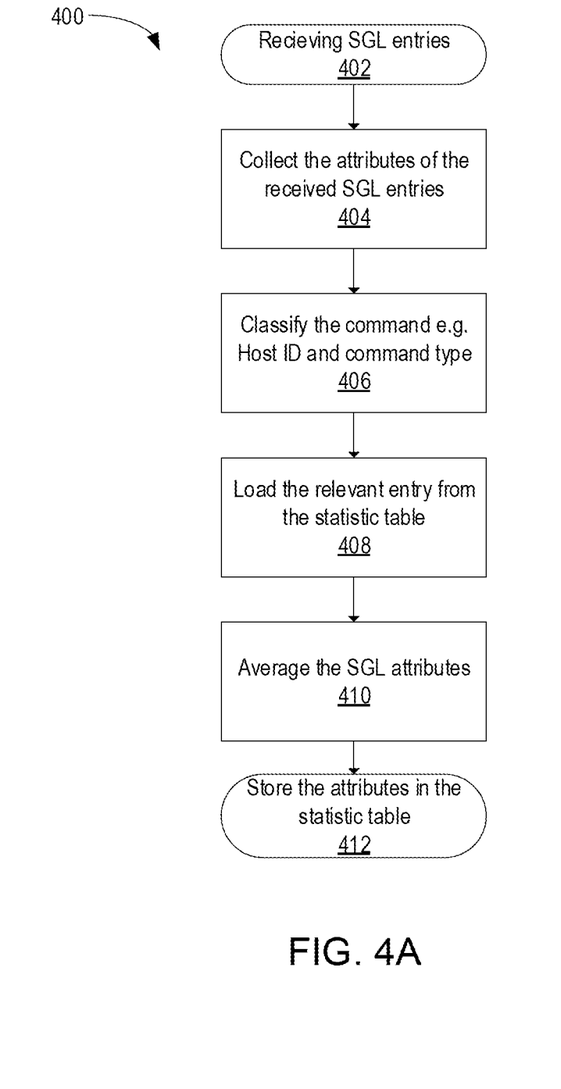
FIG. 4A is a flowchart of the process when a data storage device controller receives SGL entries.

As discussed herein, the solution is to learn the host device behavior and adaptively change the number of buckets per iteration. The learning process could be just based on statistical collection of how the host devices behaved in the past. The statistics could be collected per several parameters such as command type. In a more complex implementation, the statistic collection could be based on machine learning (ML) and artificial intelligence (AI) algorithms. In one embodiment, the statistic collection is also based upon host device ID creating an adaptive SGL fetching system optimized for performance and best utilization on a PCIe bus. The statistic table may include SGL average size, SGL size distribution, SGL alignment, SGL types, and/or average latency, for example. The parameters can be collected per command type (i.e., read, write, and other commands), host device ID, as well as others. FIG. 4A is a flowchart of the process 400 when a data storage device controller receives SGL entries. Block 402 begins when a data storage device controller begins to receive SGL entries from a host device. The data storage device controller then collects attributes of the received SGL entries at block 404. The attributes may comprise values such as SGL average size, SGL size distribution, SGL alignment, SGL type, and average latency.

Next, the data storage device controller classifies the command which includes the SGL by determining various differentiating features at block 406. For example, the data storage device controller may determine the host ID from which the SGL was sent from. Additionally, the data storage device controller may determine command type to use for classification.

Once the command is classified, the data storage device controller checks and loads for the relevant statistic entry from the statistic table at block 408. For a statistic entry to be relevant, the statistic entry must be of the same classification as the classification of the command determined by the data storage device controller at block 406. The relevant statistic entry is a dynamic entry that updates and reflects previous collected attributes of received SGL entries.

The flow then proceeds to block 410, where the data storage device controller averages the relevant statistic entry with the collect SGL attributes from block 404. The averaging process is not true averaging, but a process that accounts for the weight of historical data and recent data. Once the attributes of the statistic entry and the SGL entries have been averaged, the data storage device controller stores the updated statistic entry back to the statistic table at block 412.

Figure 4B:
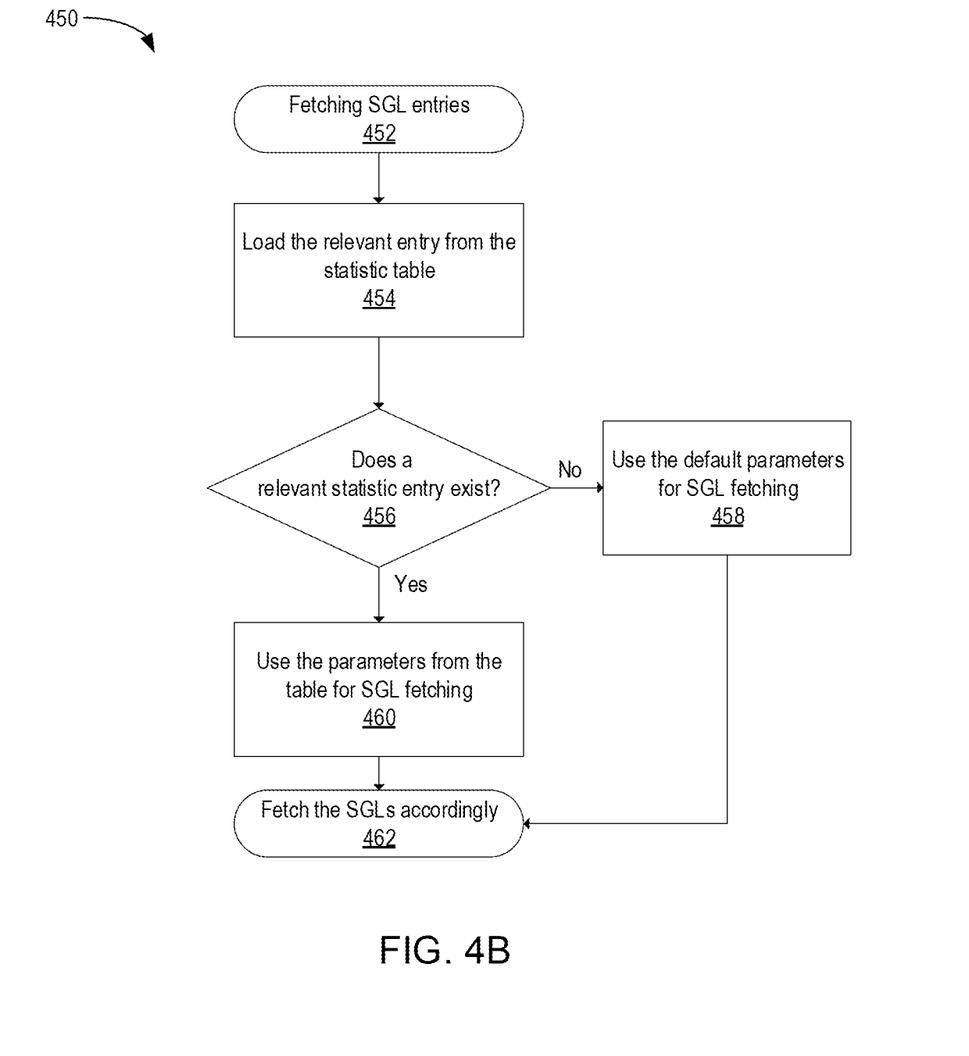
FIG. 4B is a flowchart of the process when a data storage device controller needs to fetch SGLs.

FIG. 4B is a flowchart of the process 450 when a data storage device controller needs to fetch SGLs. The flow begins at block 452 during an operation where a data storage device controller is required to fetch SGL entries. The data storage device controller begins by loading the relevant entry from the statistic table that matches the classification of the command currently underway at block 454. The classification may include matching host ID and/or command type.

At block 416, the data storage device controller determines if a relevant entry existed in the statistic table. If there was no relevant entry, the data storage device controller proceeds with default parameters for SGL fetching at block 458. The data storage device controller then fetches the SGLs according to the default parameters at block 462.

However, if a relevant statistic entry exists at block 456, the data storage device controller uses those parameters from the statistic table to optimize the SGL fetching process at block 460. With the relevant parameters set, the data storage device controller fetches the SGLs according to the historical parameters of the same classification at block 462.

Figure 5:
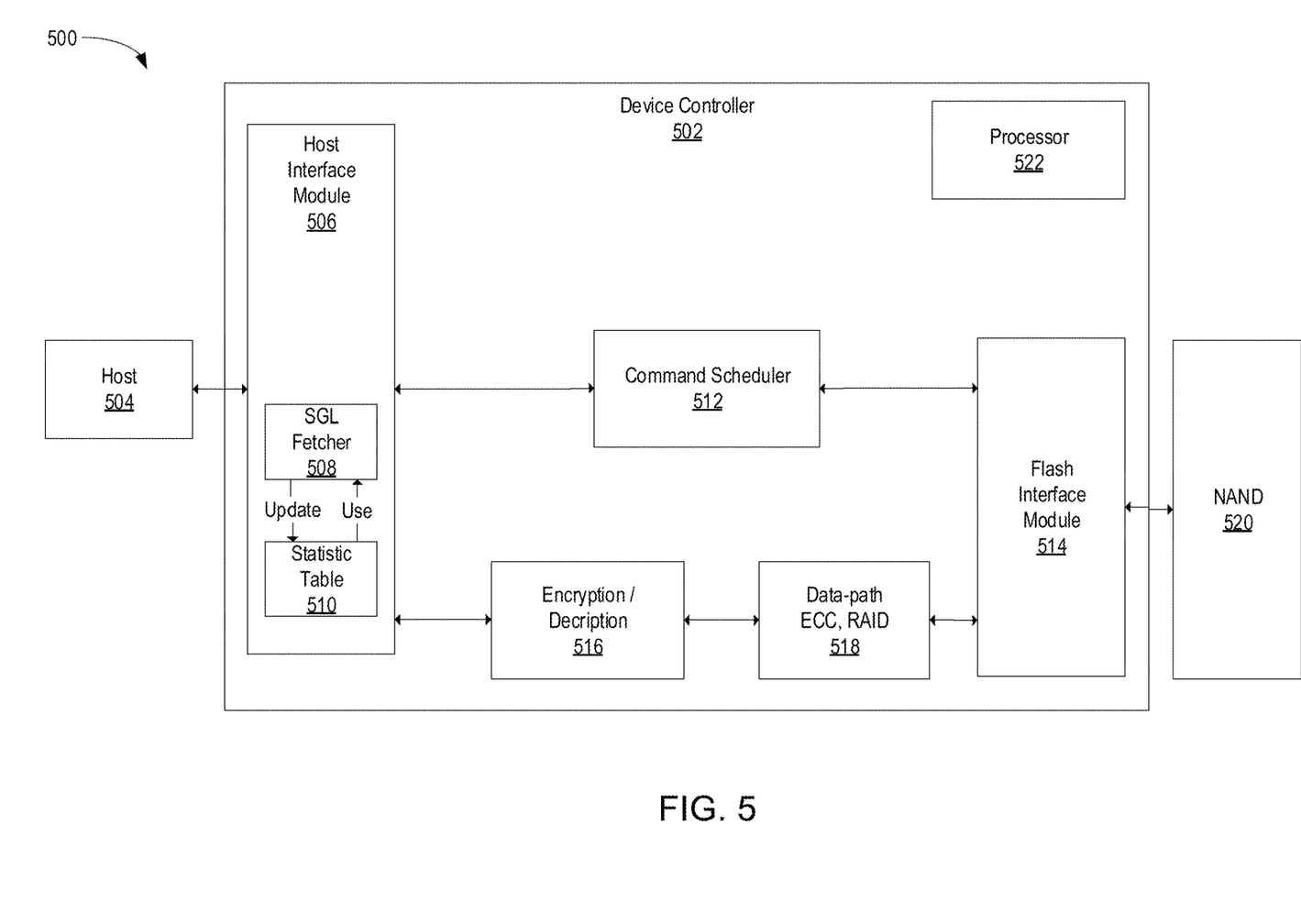
FIG. 5 is a high-level block diagram of a system, according to certain embodiments.

FIG. 5 is a high-level block diagram of a system 500, according to certain embodiments. The system 500 comprises the data storage device controller 502 coupled to a host device 504 and a memory device (e.g., NAND) 520.

The device controller 502 is comprised of a Host Interface Module (HIM) 506, a command scheduler 512, a Flash Interface Module (FIM) 514, an encryption/decryption module 516, a data-path ECC and/or RAID module 518, and a processor 522.

The HIM 506 is responsible for interactions between the host device 504 and the device controller 502. The HIM 506 incorporates the SGL fetcher module 508 responsible for fetching the SGLs. The statistic table 510 that holds the SGL parameters used by the specific host device 504 is also managed within the HIM 506. Whenever SGL fetching is required, the attributes of the SGL entries from the past are considered in order to issue efficient SGL transfers over the HIM 506.

The HIM 506 is coupled to the command scheduler 512. The command scheduler is responsible for tracking and ordering the commands processed by the device controller.

The HIM 506 is also coupled to the encryption/decryption module 516 so that the data, which the SGLs point to, may be encrypted after being received before sending to the NAND 526. From the encryption/decryption module 516, the SGLs proceed to the data-path ECC and/or RAID 518. Finally, the data reaches the FIM 514.

The FIM 514 is coupled to the command scheduler 512 and the data-path ECC, RAID 518. The FIM 514 is also responsible for communicating with the NAND 520. The FIM 514 is able to send and receive data to and from the NAND 520 according to the command scheduler 512 and the processor 522.

Figure 6:
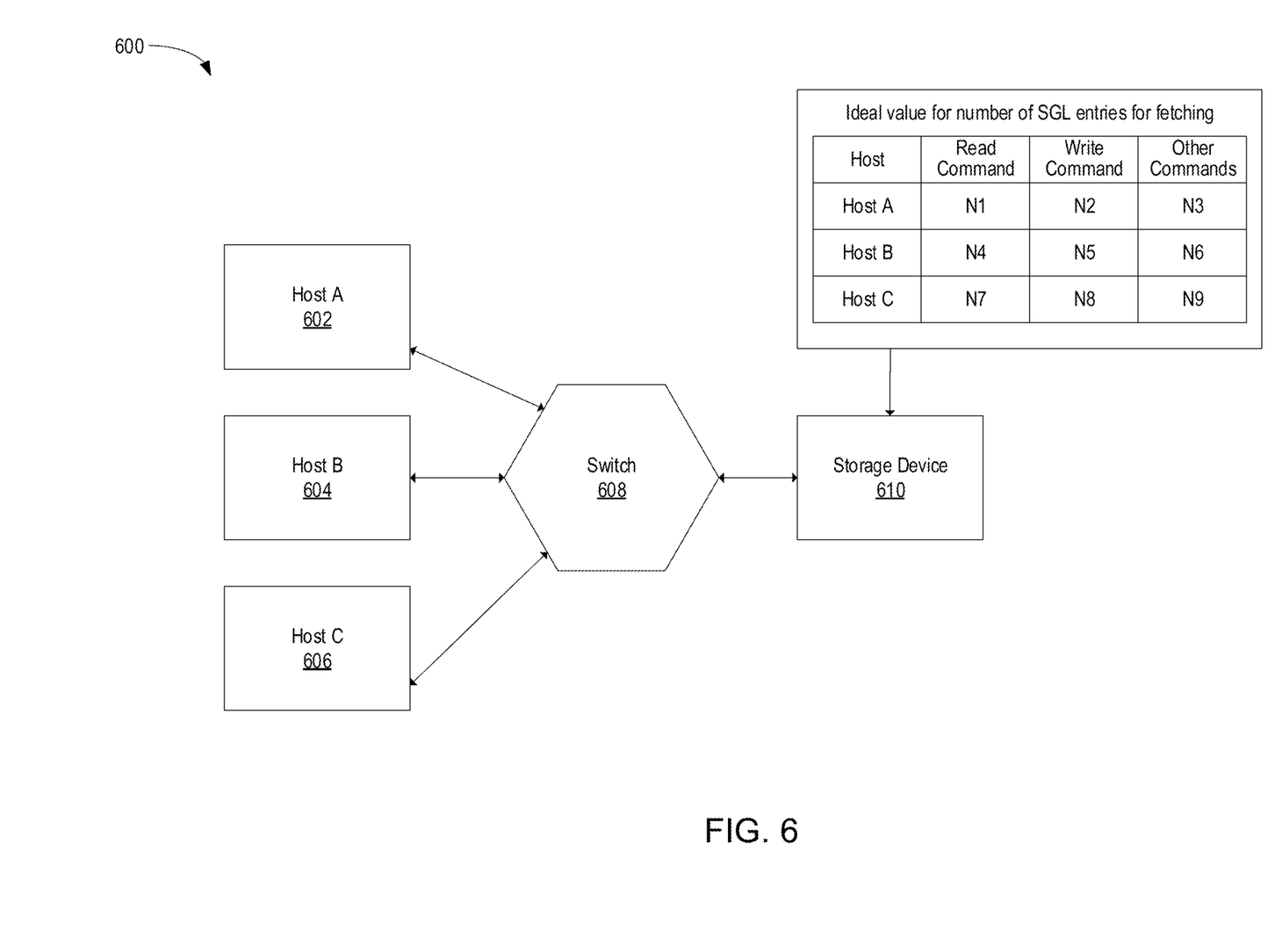
FIG. 6 is a visualization of multiple hosts connected to the data storage device where each host may have its own attributes.

FIG. 6 is a visualization 600 of multiple hosts connected to the device where each host may have its own attributes. The device controller manages the history table for the ideal value for the N parameter based on past issued commands. When fetching the SGLs from a host 602, 604, or 606, the device controller uses the relevant N value from the history table. Doing so provides the ideal performance and ideal PCIe bus utilization adapted to each specific host 602, 604, or 606.

The storage device 610 utilizes a switch 608 to communicate and differentiate between the three hosts 602, 604, and 606. While three hosts 602, 604, 606 are illustrated, the capability of supporting more hosts is contemplated. The switch 608 provides the data from a host 602, 604, or 606 to the storage device 610.

Figure 7:
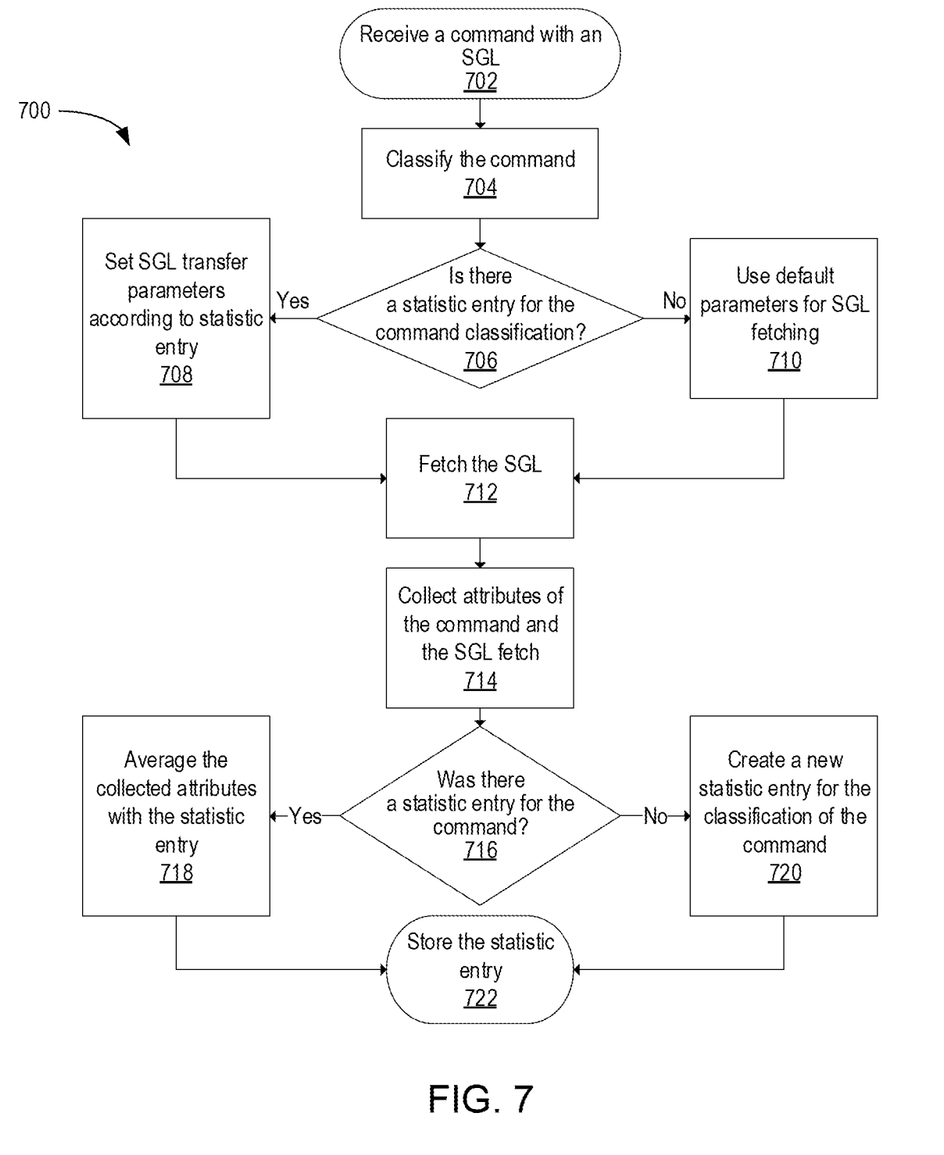
FIG. 7 is a flowchart depicting an adaptive memory allocation process, according to certain embodiments.

FIG. 7 is a flowchart depicting an adaptive memory allocation process 700, according to certain embodiments. When a device receives a command that comprises a SGL, the flow begins at block 702. The device controller begins by classifying the command at block 704. The classification involves recording differentiating features of the command like host ID and command type. Once the classification has been determined, the device controller checks the statistic table for a statistic entry for the same classification at block 706.

If a relevant entry exists in the statistic table at block 706, the device controller loads that entry and sets parameters of SGL transferring accordingly at block 708. The parameters from the entry may include amount of memory to allocate, an expected number of SGL sections, and expected latency although this list is not intended to be exhaustive, merely illustrative. If there was no existing relevant entry at block 706, the device controller sets the parameters for SGL fetching to a default value at block 710.

With parameters for SGL fetching set, the flow proceeds to block 712, where the device controller fetches the SGL. Once the SGL has been received, the device controller collects and records the attributes of the command and of the fetch that just occurred at block 714. The collected attributes are the same as those recorded in the statistic table and may include a variety of information like size, total number, and latency.

The process 700 then proceeds to block 716, where the device controller checks if there was a relevant entry in the statistic table for the received command. If there was a statistic entry, the device controller takes the collected attributes and averages them with the attributes from the statistic entry at block 718. The average process is not a true average, but a weighted average that accounts for historical data and recent data. If there was not a statistic entry for the classification of command, the device controller creates a new statistic entry for the classification and uses the collected attributes from block 714 as the values for the entry at block 720. Finally, at block 722 the device controller stores the updated or new statistic entry to the statistic table to use for future SGL fetching.

By utilizing adaptive SGL fetching, performance optimization is achieved and optimal PCIe bus utilization occurs.

In one embodiment, a data storage device, comprising a memory device and a controller coupled to the memory device, wherein the controller is configured to receive a command, wherein the command comprises a Scatter Gather List (SGL); determine an amount of memory needed for fetching the SGL, wherein the determining comprises consulting a table of one or more previous command SGL statistics; allocate the amount of memory; and fetch the SGL. Determining an amount of memory needed for fetching the SGL comprises determining that the data storage device is in low queue depth, and increasing the amount of memory that is to be allocated. The controller comprises an SGL fetcher and the table of previous commands SGL statistics located in a Host Interface Module (HIM). The controller is further configured to utilize machine learning algorithms to determine the amount of memory needed for fetching the SGL. The table of the plurality of previous command SGL statistics comprises categories of statistics for read commands, write commands, and other commands. Fetching the SGL comprises reading one or more SGL pointers to locate all segments of data of the command. A size of the SGL of the received command is indeterminable prior to performing the command. The controller is configured to receive one or more commands from one or more host devices, wherein the table of the one or more previous command SGL statistics is divided by host device of the previous commands.

In another embodiment, a data storage device, comprising a memory device and a controller coupled to the memory device, wherein the controller is configured to receive one or more commands, wherein the one or more commands comprise Scatter Gather Lists (SGLs); collect attributes of the one or more commands; classify the one or more commands; average the collected attributes of the one or more commands; and store the collected attributes in a statistic table. The collected attributes of the one or more commands comprises SGL average size, SGL size distribution, SGL alignment, SGL type, and average latency. The collected attributes are collected per command type, wherein command type comprises read commands, write commands, and other commands. The controller is further configured to load a relevant entry from a statistic table, wherein an entry is relevant when the one or more commands share attributes of the entry from the statistic table. Classifying the one or more commands comprises identifying collected attributes that are used to differentiate categories in the statistic table. The controller is further configured to receive the one or more commands from a plurality of host devices. Classifying the one or more commands identifies which host device the command is associated with. The statistic table provides an ideal value for memory allocation for each type of command from each of the plurality of host devices.

In another embodiment, a data storage device, comprising memory means and a controller coupled to the memory means, wherein the controller is configured to receive one or more commands; collect attributes of the one or more commands; and adaptively change memory allocations for future commands based upon the collected attributes. Adaptively changing memory allocations for future commands comprises maintaining a stored value for memory allocation and updating the value when new attributes are collected. The one or more commands comprise a Scatter Gather List (SGL) comprised of one or more SGL pointers. Adaptively changing memory allocations comprises utilizing an Artificial Intelligence algorithm to determine memory allocation.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a memory device; and
   a controller coupled to the memory device, wherein the controller is configured to:
   receive a command, wherein the command comprises a Scatter Gather List (SGL);
   determine an amount of memory needed for fetching the SGL, wherein the determining comprises consulting a table of one or more previous command SGL statistics;
   load a relevant entry from the table, wherein an entry is relevant when the command shares attributes of the entry from the table;
   allocate the amount of memory; and
   fetch the SGL.

2. The data storage device of claim 1, wherein determining an amount of memory needed for fetching the SGL comprises determining that the data storage device is in low queue depth, and increasing the amount of memory that is to be allocated.

3. A data storage device, comprising:
   a memory device; and
   a controller coupled to the memory device, wherein the controller is configured to:
   receive one or more commands, wherein the one or more commands comprise Scatter Gather Lists (SGLs);
   collect attributes of the one or more commands;
   classify the one or more commands;
   average the collected attributes of the one or more commands; and
   store the collected attributes in a statistic table, wherein the collected attributes of the one or more commands comprises SGL average size, SGL size distribution, SGL alignment, SGL type, and average latency, wherein the controller is further configured to load a relevant entry from a statistic table, wherein an entry is relevant when the one or more commands share attributes of the entry from the statistic table.

4. The data storage device of claim 1, wherein the controller comprises an SGL fetcher and the table of the one or more previous commands SGL statistics located in a Host Interface Module (HIM).

5. The data storage device of claim 1, wherein the controller is further configured to utilize machine learning algorithms to determine the amount of memory needed for fetching the SGL.

6. The data storage device of claim 1, wherein the table of previous command SGL statistics comprises categories of statistics for read commands, write commands, and other commands.

7. The data storage device of claim 1, wherein fetching the SGL comprises reading one or more SGL pointers to locate all segments of data of the command.

8. The data storage device of claim 1, wherein a size of the SGL of the received command is indeterminable prior to performing the command.

9. The data storage device of claim 1, wherein the controller is configured to receive one or more commands from one or more host devices, wherein the table of the one or more previous command SGL statistics is divided by host device of the previous commands.

10. The data storage device of claim 3, wherein the collected attributes are collected per command type, wherein command type comprises read commands, write commands, and other commands.

11. The data storage device of claim 3, where classifying the one or more commands comprises identifying collected attributes that are used to differentiate categories in the statistic table.

12. The data storage device of claim 3, wherein the controller is further configured to receive the one or more commands from a plurality of host devices.

13. The data storage device of claim 12, wherein classifying the one or more commands identifies which host device a command is associated with.

14. The data storage device of claim 13, wherein the statistic table provides an ideal value for memory allocation for each type of command from each of the plurality of host devices.

15. A data storage device, comprising:
memory means; and
a controller coupled to the memory means, wherein the controller is configured to:
receive one or more commands, wherein the one or more commands comprise a Scatter Gather List (SGL) comprised of one or more SGL pointers;
collect attributes of the one or more commands, wherein the collected attributes of the one or more commands comprises SGL average size, SGL size distribution, SGL alignment, SGL type, and average latency;
adaptively change memory allocations for future commands based upon the collected attributes; and
load a relevant entry from a statistic table, wherein an entry is relevant when the one or more commands share attributes of the entry from the statistic table.

16. The data storage device of claim 15, wherein adaptively changing memory allocations for future commands comprises maintaining a stored value for memory allocation and updating the stored value when new attributes are collected.

17. The data storage device of claim 15, wherein the controller is configured to determine whether a relevant entry exists in the statistic table.

18. The data storage device of claim 15, wherein adaptively changing memory allocations comprises utilizing an Artificial Intelligence algorithm to determine memory allocation.

19. The data storage device of claim 15, wherein the controller comprises a host interface module that includes a Scatter Gather List (SGL) fetcher.

20. The data storage device of claim 15, wherein the controller is configured to utilize default parameters when no relevant entry in the statistic table is present.

* * * * *